Figure 1:
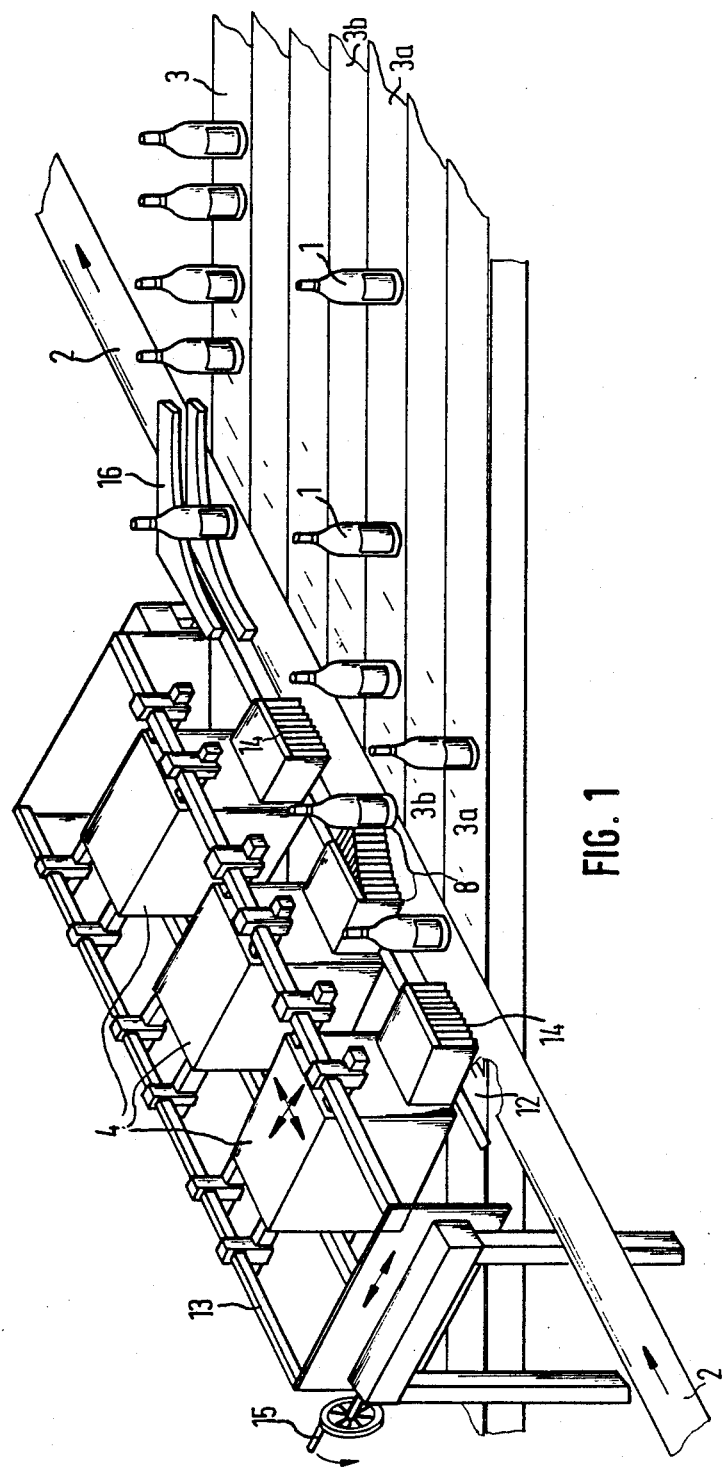

United States Patent [19]

Heuft

[11] Patent Number: 4,986,407
[45] Date of Patent: Jan. 22, 1991

[54] APPARATUS FOR CONTROLLING THE PATH OF TRANSPORTATION OF ARTICLES

[76] Inventor: Bernhard Heuft, Im Sonnenwinkel 14, D-5475 Burgbrohl, Fed. Rep. of Germany

[21] Appl. No.: 294,628
[22] PCT Filed: Apr. 7, 1988
[86] PCT No.: PCT/EP88/00283
§ 371 Date: Dec. 7, 1988
§ 102(e) Date: Dec. 7, 1988
[87] PCT Pub. No.: WO88/07968
PCT Pub. Date: Oct. 20, 1988

[30] Foreign Application Priority Data
Apr. 7, 1987 [DE] Fed. Rep. of Germany ....... 3711605

[51] Int. Cl.$^5$ .............................................. B65G 47/00
[52] U.S. Cl. ...................................... 198/367; 198/438
[58] Field of Search ............... 198/436, 438, 448, 367, 198/367.1, 370, 372, 560, 350

[56] References Cited

U.S. PATENT DOCUMENTS

| 3,026,988 | 3/1962 | Fisk | 198/370 X |
|---|---|---|---|
| 3,139,965 | 7/1964 | Eggert | 198/367 X |
| 3,502,123 | 3/1970 | Golick et al. | 198/367 X |
| 3,664,084 | 5/1972 | Meckley | 198/367 X |
| 3,858,712 | 1/1975 | Sluysmans | 198/350 |
| 3,878,933 | 4/1975 | Bauer et al. | 198/350 |
| 4,643,291 | 2/1987 | Counter et al. | 198/367 X |

FOREIGN PATENT DOCUMENTS

| 0066142 | 12/1982 | European Pat. Off. | 198/438 |
|---|---|---|---|
| 2126611 | 1/1973 | Fed. Rep. of Germany | 198/367 |
| 2917286 | 11/1980 | Fed. Rep. of Germany | 198/438 |

Primary Examiner—Joseph E. Valenza
Assistant Examiner—James R. Bidwell
Attorney, Agent, or Firm—Sughrue, Mion, Zinn, Macpeak & Seas

[57] ABSTRACT

An apparatus for controlling the path of transportation of articles comprises a first conveyor belt which delivers the articles to a plurality of second conveyor belt which delivers the articles to a plurality of second conveyor belts arranged in parallel side-by-side relationship which continue the conveyance of the articles. A plurality of deflectors selectively deflect the articles from the first conveyor belt to one of the second conveyor belts. In order to attain an especially compact construction the first conveyor belt extends obliquely over and rests on the second conveyor belts and is a belt of such small thickness that the articles can slide form the first conveyor belt extends obliquely over and rests on the second conveyor belts and is a belt of such small thickness that the articles can slide form the first conveyor belt onto one of the second conveyor belts without the risk of toppling over. The deflectors are arranged on the side of the first conveyor belt facing away form the direction of conveyance of the second conveyor belts. The first conveyor belt can be a steel belt having a thickness between 0.1 to 0.5 mm.

5 Claims, 3 Drawing Sheets

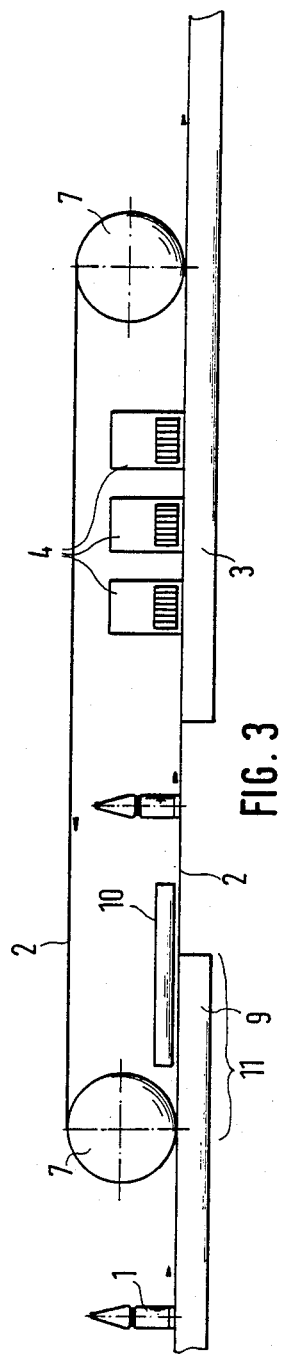

APPARATUS FOR CONTROLLING THE PATH OF TRANSPORATION OF ARTICLES

The invention relates to an apparatus for controlling the path of transportation of articles of all sorts. The articles are delivered on a first conveyor belt and are deflected by deflecting means to the second, or one of several second, conveyor belts arranged in parallel side-by-side relationship. The deflecting means are controlled by a control means. The apparatus can be used, for example, to continue transportation of the articles having a certain feature, or a certain combination of features, on a specific one of the second conveyor belts. The control of the deflecting means can also be such that the articles are distributed substantially uniformly on the or over the second conveyor belt or belts.

Such an apparatus is known from EP-A-3 111, FIG. 13. There the articles are conveyed by means of a spiral conveyor along a wall built up by the deflecting means and an oblique path across the second conveyor belts. By diverting or retracting individual ones of the deflecting means the articles are released for further transportation on a selected one of the second conveyor belts. The use of a spiral conveyor requires that the articles succeed one another at a distance corresponding to the pitch of the screw. The change of the path of motion of the articles upon transition from the conveyor screw to the second conveyor belts is abrupt, which limits the speed of the second conveyor belts. Difficulties in respect of construction are encountered in that the deflecting means are arranged in the direction of travel of the second conveyor belts opposite the spiral conveyor so that they must be pulled away in upward direction for release of the articles. Especially in case of bottles for beverages there is the risk that the neck portion may be caught by the only partially retracted deflecting means and so the bottle will topple over.

DE-A-1 548 285 describes an apparatus for sorting articles where the articles are removed from a first conveyor belt by a star wheel with suction nozzles and are set down again on a selected one of several second conveyor belts. The operating speed in this system is limited by the star wheel and the abrupt change of the direction of travel as the articles are put down on one of the second conveyor belts.

From DE-A-2 358 185 an apparatus is known where the articles are transversely off-set on the first conveyor belt by means of pushers which move along with the first conveyor belt and are extended in transverse direction by link motion. The articles are then passed on to various second conveyor belts by guide railings extending different lengths beyond the first conveyor belt. In view of the accompanying pushers and the slotted link motion the operating speed is limited. Moreover, much space is needed in the direction of conveyance of the first conveyor belt. For separate sorting out of articles it is also necessary that they are spaced a considerable minimum distance apart.

It is the object of the invention to provide an apparatus for controlling the path of conveyance of articles which requires little space in the direction of conveyance of the second conveyor belt or belts and which permits very high conveying speeds.

This object is realized in that the first conveyor belt extends obliquely across and rests on the second conveyor belt or belts and is sufficiently thin so that the articles can slide from the first conveyor belt to the second conveyor belt or belts without the risk of toppling over, and that the deflecting means arranged on the side of the first conveyor belt facing away from the direction of conveyance of the second conveyor belt or belts, in retracted condition, allow the articles to move forward on the first conveyor belt, and are extensible in the direction of conveyance of the second conveyor belt or belts.

The belt forming the first conveyor belt may be made of steel or plastic. Preferably it is a steel belt having a thickness between 0.1 and 0.5 mm. Bottles holding beverages, for example, can be readily shifted by the deflecting means from such a steel belt onto a second conveyor belt.

In general, a plurality of second conveyor belts is provided in order to be able to convey the bottles sorted according to features thereof to various further treating means. However, it is also possible to use only a single second conveyor belt which is especially wide and where the deflected articles are then sorted according to certain features and positioned at different sites in the width of the second conveyor belt. If several second conveyor belts are used, these will suitably be conventional open-link chain conveyor belts. If only a single second conveyor belt is used, a wide steel belt is suited, for example. Hereafter the embodiment with a plurality of second conveyor belts will be discussed. However, it ought to be understood that in lieu thereof also a single, especially wide second conveyor belt may be used.

The higher the speeds of the first and the second conveyor belts, the smaller should be the angle between said conveyor belts. However, it is surprising that also at an angle of 45° very high speeds of 1 m/sec, for example, can be reached with bottles holding beverages.

The first conveyor belt is preferably a belt guided along an endless path which is returned preferably at a distance above the second conveyor belts. This is suitable for constructional reasons because otherwise the second conveyor belts would be enclosed by the belt. Suitably the articles, e.g. bottles holding beverages, are transferred from a preceding conveying means to the first conveyor belt directly beside the plurality of second conveyor belts.

The deflecting means can be selected among virtually all hitherto known systems from the monocylindrical ejector—pusher—via blow nozzles, pivotable flaps, to complicated systems—such as co-travelling pushers—or the switch described in EP-A 3 111 and composed of deflecting segments.

In case of less stable articles, e.g. bottles holding beverages, which arrive in close succession a segmented switch as described in EP-A-3 111 is suitable with which, in the extended state of the deflecting segments, the deflection curve forms a constant and optimally smooth transition from the first to one of the second conveyor belts.

Depending on the stability of the articles to be conveyed and the sliding characteristics of the conveyor belts employed it is also possible to terminate the deflection curve formed by the deflecting segments not precisely in the direction of travel of the second conveyor means, and to make it wider instead. In this way either the number of deflecting segments can be reduced, or it is possible, by alternating extension of the last deflecting segments, to make the deflection curve alternatingly narrower and wider, and thus to distribute the articles over the second conveyor belts. This is particularly interesting when the speed of the second conveyor belts is lower than that of the first conveyor belt. The distribution of the articles over the second conveyor belts can be achieved also with a pusher of variable extension length or ejection force.

As described in EP-B 19 117 in conjunction with FIGS. 3 and 4 thereof, in deflecting devices composed of a plurality of individual extensible segments the deflecting impulse can be varied in intensity by varying the number of segments used for one deflection operation. If, for example, only the first seven out of altogether ten deflecting segments belonging to one deflecting element are extended, the deflection impulse is weaker, and the deflection angle is smaller, than if all ten deflecting segments were in operation. With the use of blow nozzles as deflecting means the same effect can be achieved by variation of the number of activated blow nozzles, or the intensity thereof. With the use of a deflecting flap (DE-A-2 728 478) the same effect can be achieved by pivoting the deflecting flap different distances. In this way the apparatus of the invention offers the possibility of associating a single deflecting means to several, e.g. three, second conveyor belts. In that case, with the use of deflecting means having a plurality of extensible deflecting segments, it depends on the number of employed deflecting segments on which one of the three second conveyor belts the articles will arrive and will be carried off.

It is surprising that with the apparatus of the invention very high operating speeds can be reached, and that even with deflection of the articles from the first conveyor belt in a relatively narrow curve to one of the second conveyor belts.

The operating speed is especially high in comparison with deflecting means where the articles are deflected from a first conveyor belt to a second conveyor belt running in parallel to the first one. The reason may be that in first and second conveyor belts extending in parallel the articles to be deflected move along an "S" curve, i.e. first a left turn and then a right turn, so that thereafter they again move in the original direction along a parallel path offset a distance corresponding to the space between the two conveyor belts. It seems that the risk of toppling, for example, of bottles holding beverages is especially high if such bottles are moved along such an "S" path. In contrast thereto, in the apparatus of the invention the deflection of the articles from the first conveyor belt to one of the second conveyor belts takes place on a single, smooth, curved path curved in a single direction.

The risk that unstable articles will topple over can be further reduced by positioning the articles on the first conveyor belt such that the center of gravity thereof is just above the margin of the first conveyor belt. Hence, the articles are shifted on the first conveyor belt in the direction of movement of the second conveyor belts so far that they still stand safely on the first conveyor belt. Then only a relatively minor deflecting impulse by the deflecting means is required in order to shift the articles in the direction of movement of the second conveyor belts so far that the articles contact the second conveyor belts. As soon as this happens the articles are drawn off the first conveyor belt and are then further conveyed by the respective one of the second conveyor belts.

Figure 2:
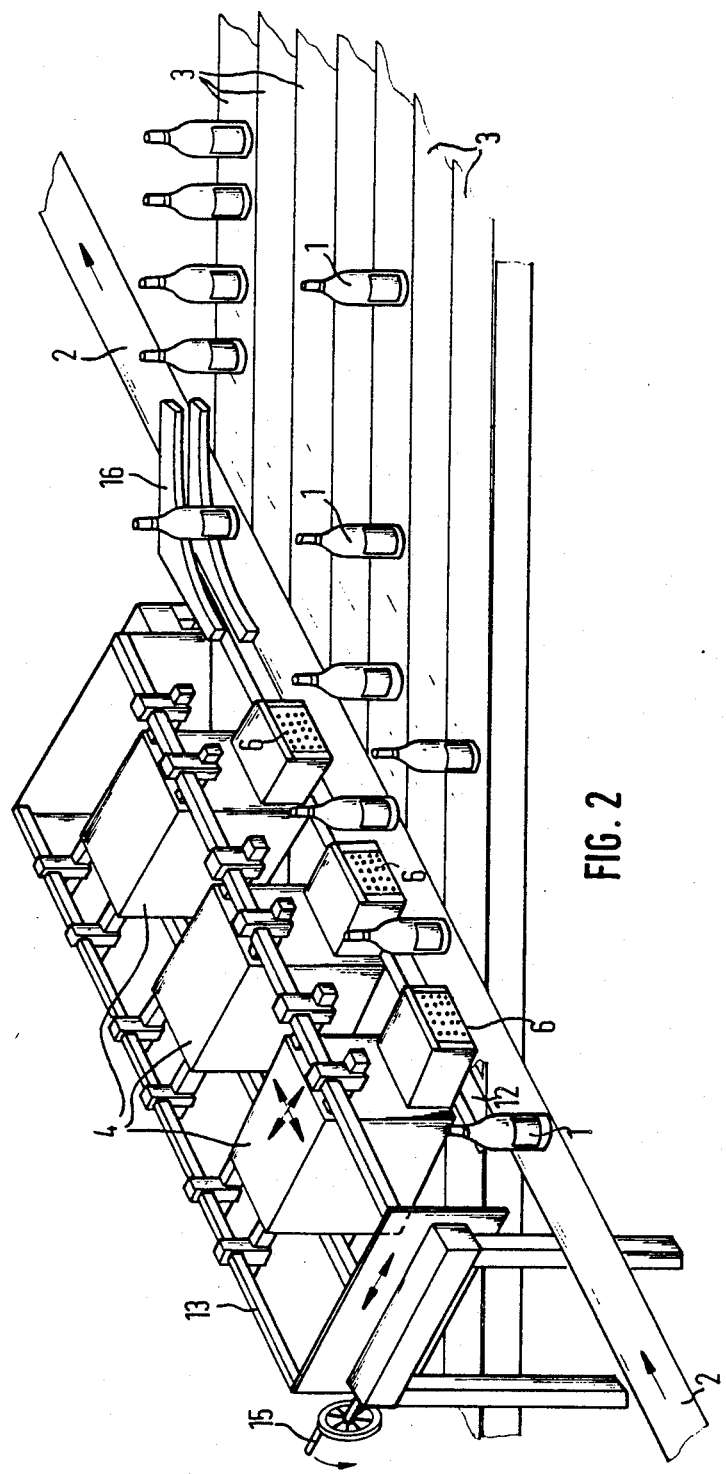

Examples of the invention will now be explained with reference to the drawing in which FIG. 1 is a plan view of the conveyor path control means;

FIG. 2 shows a conveyor path control means similar to that of FIG. 1 but with blow nozzles as deflecting means; and FIG. 3 shows the guidance of the first conveyor belt.

Hereafter the apparatus of the invention will be explained by way of example in connection with an apparatus for sorting bottles for beverages. However, the invention is useful also in connection with apparatuses for sorting other articles, e.g. parcels, canned products and the like.

In the example of FIG. 1 beverage-holding bottles 1 are the articles to be sorted. The bottles 1 arrive on a first conveyor belt 2. The first conveyor belt 2 is formed by an endless steel belt of 0.3 mm thickness which is trained over two rolls 7 along a closed path (FIG. 3).

The first conveyor belt 2 slides at an angle of about 45° obliquely over a plurality of second conveyor belts 3 arranged in parallel side-by-side relationship. The bottles 1 are sorted such that each bottle is deflected to a selected one of said second conveyor belts 3 and is then carried along by said belt. The second conveyor belts 3 are open-link chain conveyor belts, as generally used for the transportation of bottles holding beverages.

The deflecting means 4 each comprise a plurality of individually extensible deflecting segments 14 which, when extended, shift the bottles 1 from the first conveyor belt 2 down onto one of the second conveyor belts 3. The forward ends of the deflecting segments 14 in extended condition form a continuous curved deflecting face 8 which effects uniform and gradual deflection of the bottles 1. For each two of the second conveyor belts 3 one deflecting means 4 is provided. If in a deflecting operation all the deflecting segments 14 are employed, the deflection is stronger, and the bottles are deflected to the second conveyor belt 3a. If the last two deflecting segments 14 are not activated then the bottles 1 are deflected to the second conveyor belt 3b. As soon as the bottles 1 are pushed off the first conveyor belt 2 so far that they come to rest on the second conveyor belt 3, they are seized by the latter and carried off in the right-hand direction in FIG. 1. The deflecting faces 8 suitably are covered with an anti-friction coating in order that the bottles 1 are merely deflected without being substantially slowed down. The highest operating speeds are attainable if the speed of the first conveyor belt 2 is within a range between one time and two times the speed of the second conveyor belts 3.

The deflecting means 4 and the deflecting faces 8 thereof need not extend over the entire width of the first conveyor belt 2. Especially at high conveying speeds it is sufficient if the bottles 1 are given a push in the direction of the second conveyor belts 3.

At high conveying speeds of 1 m/sec, for example, this impulse is sufficient to cause the bottles to move part of the way from the first conveyor belt 2 to one of the second conveyor belts 3 by themselves, owing to the inertia thereof. With standard bottles of 0.7 l capacity and about 7 cm diameter it is sufficient, at a conveying speed of 1 m/sec and a width of the first conveyor belt 2 of 15 cm, when the deflecting means 4 extend across half the width of the first conveyor belt 2 when in extended condition. When the bottles 1 stand approximately in the center of the first conveyor belt 2 they are deflected by 3.5 cm and receive a sufficiently strong push to freely move along the remaining distance of 7.5 cm owing to their inertia and then come to rest on one of the second conveyor belts 3. Since the bottles 1, in the course of this deflection phase, are automatically also somewhat slowed down, it is advisable to select the speed of the first conveyor belt 2 accordingly higher than that of the second conveyor belts 3 so that the bottles 1 will have exactly the speed of the second conveyor belts 3 when they come to rest thereon.

Outside the second conveyor belts 3 the first conveyer belt 2 is guided by a multiplicity of rolls or by sliding bearings (FIG. 3). With a thin steel belt as first conveyor belt 2 the sliding bearings are preferably made of synthetic resin, e.g. PTFE. In order to avoid any risk of injuries to the operating personnel the edges of the steel belt are covered by the guide means or shielded by an additional grid. The steel belt runs over lateral rolls 7 arranged above the plane of the second conveyor belts 3 so that the lower portion of the steel belt running in one direction, so that its path of travel forms an acute angle with the direction of movement of the second conveyor belts 3, serves as first conveyor belt 2, while the returning portion moves a distance above said plane that corresponds to the diameter of the rolls 7. The first conveyor belt 2 can have any desired length. Since it has a construction deviating from customary conveyor belts, e.g. open-link chain conveyors, it suitably is of only short length, i.e. the rolls 7 are arranged a small distance beside the plurality of second conveyor belts 3.

In the embodiment illustrated by the drawing the preceding conveying means is a conventional open-link chain conveyor 9 whose end extends along a short distance 11 in parallel to the beginning of the first conveyor belt 2 and directly alongside the latter. Within said distance the bottles 1 are shifted by a simple railing 10 from the open-link chain conveyor 9 onto the first conveyor belt 2.

The edge of the first conveyor belt 2 facing away from the direction of conveyance of the two conveyor belts 3 is subject to especially high wear because this is where any possible unevenness, or even projecting portions of the second conveyor belts, may contact the first conveyor belt 2. This side of the first conveyor belt 2 is therefore suitably protected by a rail 12 extending along the entire width of the plurality of second conveyor belts 3 and extending like a guide lip from above in a width of 2 cm, for example, below said side of the first conveyor belt 2. Any unevenness, or smaller objects lying on one of the second conveyor belts 3, are urged downwardly by the rail 12, or the rim of the first conveyor belt 2 is lifted by the upwardly urged rail 12, so that at least the rim of the first conveyor belt 2 is protected from damage. The circumstance that such objects or unevenness then pass beneath the second conveyor belt 2 results in scratches and particularly high local wear of the first conveyor belt 2, but it does not damage the first conveyor belt 2 so much that thereby the operation of the sorting apparatus is interrupted.

FIG. 1 shows altogether eight second conveyor belts 3. Three deflecting means 4 are held by a frame 13. By suitable measures the deflecting means 4 are held so as to be shiftable relative to the frame 13. Moreover, the frame 13 is slidable as a whole by means of the hand wheel 15 in a direction normal to the first conveyor belt 2. The deflecting means 4 are associated respectively to each two of the second conveyor belts 3. By means of a stationary deflecting curve 16 the bottles not shifted by any one of the deflecting means 4 onto one of the second conveyor belts 3 are deflected means 4 onto one of the second conveyor belts 3.

FIG. 2 illustrates an embodiment similar to that of FIG. 1 in which the deflecting means 4 have blow nozzles 6. By control of the intensity and the number of blow nozzles 6 of each deflecting means 4 the bottles 1 are deflected to different ones of the second conveyor belts 3. The blow nozzles 6 are controlled in accordance with the position and/or the speed of the bottles 1 to be deflected, or in accordance with their weight, on the basis of data gained.

I claim:

1. An apparatus for controlling the path of transportation of articles comprising:
    a first conveyor belt which delivers the articles,
    a plurality of second conveyor belts arranged in parallel side-by-side relationship which continue the conveyance of the articles,
    a plurality of deflecting means for deflecting the articles from said first conveyor belt to a selected one of said second conveyor belts, and
    a means for controlling the deflecting means;
    wherein said first conveyor belt extends obliquely across and rests, across the entire width thereof, on the second conveyor belts and is relatively thin so that the articles can slide from said first conveyor belt onto one of said second conveyor belts without the risk of toppling over,
    wherein said deflecting means are arranged on the side of said first conveyor belt facing away from the direction of conveyance of the second conveyor belts, and
    wherein said first conveyor belt is endless and is guided along a closed path completely above said second conveyor belts.

2. Apparatus according to claim 1, wherein said first conveyor belt is a steel belt having a thickness between 0.1 and 0.5 mm.

3. Apparatus according to claim 1, wherein said first conveyor belt is arranged at an angle of 30° to 60° with respect to said second conveyor belts.

4. Apparatus according to claim 1, wherein said deflecting means are comprised of incidentally retractable and extensible segments which, in retracted condition, allow the articles to pass on said first conveyor belt and which are extensible in the conveying direction of said second conveyor belts.

5. Apparatus according to claim 1 wherein said deflecting means are comprised of blow nozzles.

* * * * *